United States Patent
Trieu et al.

(10) Patent No.: US 6,314,472 B1
(45) Date of Patent: Nov. 6, 2001

(54) ABORT OF DRAM READ AHEAD WHEN PCI READ MULTIPLE HAS ENDED

(75) Inventors: Tuong P. Trieu, Folsom; David D. Lent, Placerville; Ashish S. Gadagkar, Folsom; Vincent E. VonBokern, Rescue; Zohar Bogin, Folsom, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/203,127

(22) Filed: Dec. 1, 1998

(51) Int. Cl.[7] .............................. G06F 3/00; G06F 12/00; G06F 12/14; G06F 13/00

(52) U.S. Cl. ............................ 710/5; 710/15; 711/137; 711/213

(58) Field of Search ............................. 710/5, 7, 15, 17, 710/20, 23, 34, 129, 22; 711/3, 118, 145, 137, 154

(56) References Cited

U.S. PATENT DOCUMENTS

| | | | | |
|---|---|---|---|---|
| 5,325,508 | * | 6/1994 | Parks et al. | 711/118 |
| 5,423,014 | * | 6/1995 | Hinton et al. | 711/3 |
| 5,553,265 | * | 9/1996 | Abato et al. | 711/143 |
| 5,627,993 | * | 5/1997 | Abato et al. | 711/143 |
| 5,634,112 | * | 5/1997 | Thome et al. | 711/154 |
| 5,664,117 | * | 9/1997 | Shah et al. | 710/100 |
| 5,689,653 | * | 11/1997 | Karp et al. | 712/222 |
| 5,758,106 | * | 5/1998 | Fenwick et al. | 710/125 |
| 5,813,038 | * | 9/1998 | Thome et al. | 711/154 |
| 5,960,459 | * | 9/1999 | Thome et al. | 711/154 |
| 5,983,324 | * | 11/1999 | Ukai et al. | 711/137 |
| 6,012,106 | * | 1/2000 | Schumann et al. | 710/22 |
| 6,035,383 | * | 3/2000 | Seal | 711/213 |
| 6,052,772 | * | 4/2000 | Kark et al. | 712/38 |
| 6,092,186 | * | 7/2000 | Betker et al. | 712/233 |
| 6,098,115 | * | 8/2000 | Eberhard et al. | 710/7 |
| 6,119,203 | * | 9/2000 | Snyder et al. | 711/137 |
| 6,170,030 | * | 1/2001 | Bell | 710/129 |

\* cited by examiner

Primary Examiner—Thomas Lee
Assistant Examiner—Chun Cao
(74) Attorney, Agent, or Firm—Blakely, Sokoloff, Taylor & Zafman LLP

(57) ABSTRACT

A computer system is provided. The computer system includes a host processor (HP), a system memory (SM), and an input/output (I/O) master device to perform a read of a continuous stream of data to the SM. The computer system also includes a bridge coupled to the HP, SM, and I/O master device. The bridge reads ahead to the SM when the I/O master device reads a continuous stream of data from the SM. The bridge aborts read ahead accesses to the SM, prior to an access commit point to the SM, responsive to disengagement of the I/O master device.

23 Claims, 2 Drawing Sheets

ABORT OF DRAM READ AHEAD WHEN PCI READ MULTIPLE HAS ENDED

BACKGROUND OF THE INVENTION

I. Field of the Invention

The present invention relates to computer systems. More particularly, the present invention relates to host bridges in computer systems.

II. Background Information

A typical computer system includes a host processor coupled to a host bridge. The host bridge interfaces the processor to, essentially, the rest of the computer system. The host bridge may be coupled to an input/output (I/O) bus such as a Peripheral Component Interconnect (PCI) bus. The host bridge may include a memory controller that is coupled to a system memory that may be a Dynamic Random Access Memory (DRAM). A PCI master device may be coupled to the PCI bus. The PCI master device may perform a read of a continuous stream of data using PCI read multiple semantics.

To sustain a PCI master read of a continuous stream (PCI read multiple semantics) to DRAM with minimal latency, the host bridge speculatively performs prefetching (or read ahead) of next sequentially addressed lines of data residing in the DRAM. The prefetched data from the DRAM is stored in a read data return holding buffer of the host bridge and is ready to be transferred to the PCI master at zero wait states. When the PCI master eventually disengages, the unused data, already prefetched to the holding buffer is to be discarded by the host bridge. In addition, for those prefetched lines of data that are still en-route to the holding buffer, the host bridge waits for data to return from the DRAM, and then proceeds to discard that data. This procedure, however, involves waiting for the unwanted data to be fetched and to return to the holding buffer, and then discarding that data. Accordingly, system memory bandwidth is wasted by the host bridge's unnecessary request of data from DRAM.

It is desirable to provide a mechanism that reduces unnecessary access to memory to avoid wasting precious memory bandwidth.

SUMMARY OF THE INVENTION

The present invention provides a computer system. The computer system includes a host processor (HP), a system memory (SM), and an input/output (I/O) master device to perform a read of a continuous stream of data to the SM. The computer system also includes a bridge coupled to the HP, SM, and I/O master device. The bridge reads ahead to the SM when the I/O master device reads a continuous stream of data from the SM. The bridge aborts read ahead accesses to the SM, prior to an access commit point to the SM, responsive to disengagement of the I/O master device.

BRIEF DESCRIPTION OF THE DRAWINGS

The features, aspects, and advantages of the present invention will become more fully apparent from the following Detailed Description, appended claims, and accompanying drawings in which:

DETAILED DESCRIPTION OF THE INVENTION

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

Figure 1:
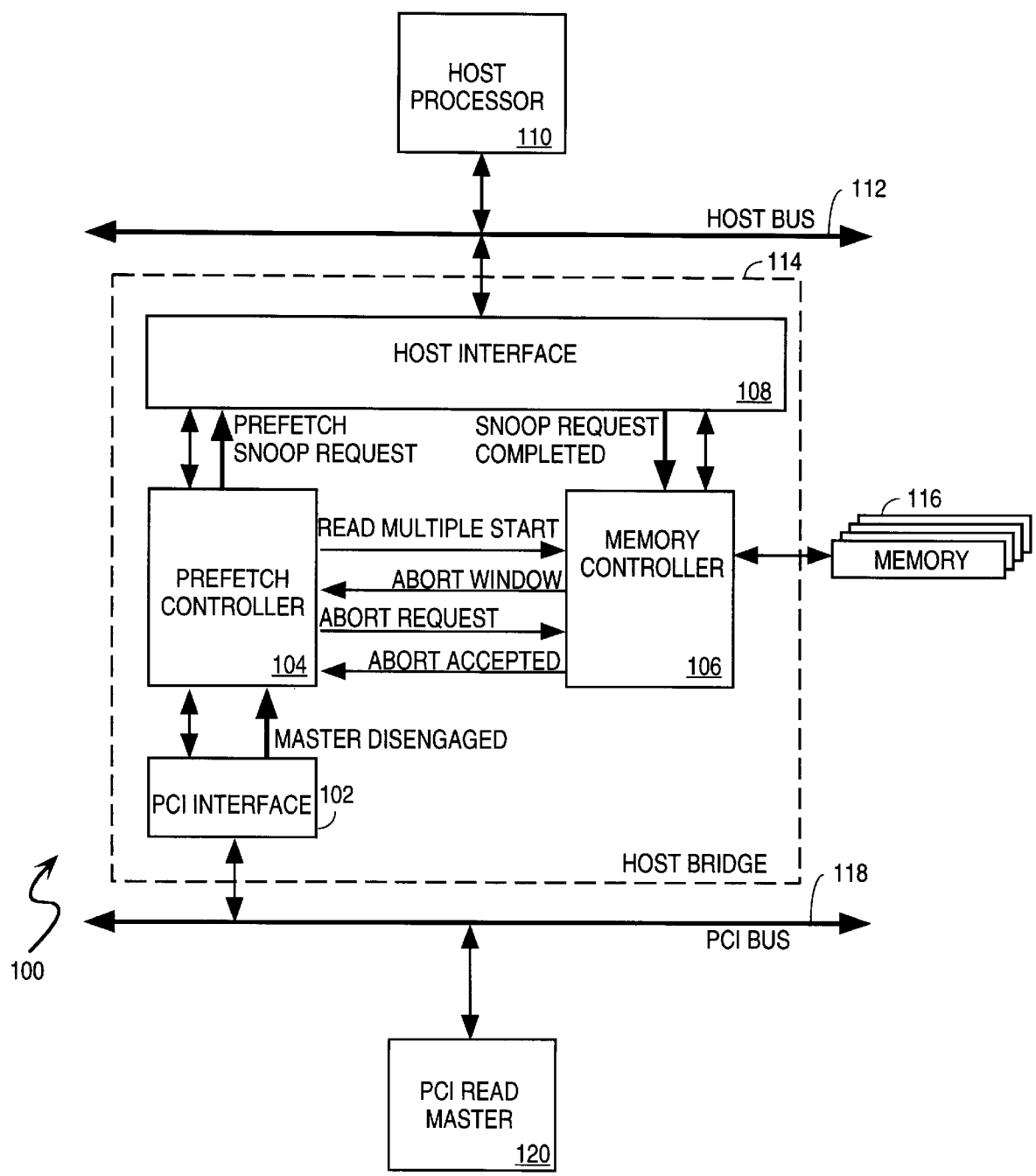
FIG. 1 illustrates a computer system including a host bridge according to one embodiment of the present invention.

FIG. 1 illustrates a computer system according to one embodiment of the present invention. Computer system 100 includes a host processor 110 coupled to a host bus 112. The host bus 112 is coupled to a host bridge 114 (shown in dotted lines). Inside the host bridge 114 there are a plurality of control devices. A memory controller 106 interfaces with a system memory 116. In one embodiment according to the present invention, system memory 116 includes a Dynamic Random Access Memory [DRAM].

The computer system also includes an Input/Output (I/O) bus 118 which, in the embodiment of the present invention described herein, is a Peripheral Component Interconnect (PCI) bus. The host bridge 114 includes an interface that is coupled to the PCI bus called PCI Interface 102. An interface is a controller that talks to the device in question using the appropriate protocol that is defined for that particular interface. Part of the task of an interface is to capture data packets or command packets and transmit them across the interface. For the purpose of holding packets to be further transmitted, the interfaces include queues. A queue is a holding buffer that can hold a number of packets that have been received from that interface for the purpose of routing the packets elsewhere. The host bridge 114 also includes a host interface 108 that communicates with devices coupled to host bus 112, such as host processor 110.

PCI bus 118 has connected thereto a plurality of I/O devices of which I/O device 120 is shown. In one embodiment of the present invention, the I/O devices include PCI devices of which PCI read master 120 is shown. The PCI read master 120 may access system memory 116 via host bridge 114. The PCI read master device may specify that it desires to have one or more lines of data from system memory 116. To minimize latency, when more than one contiguous line of data such as a continuous stream of data, is requested by PCI read master 120, computer system 100 utilizes "prefetching". The term "prefetching" is analogous with "reading ahead". In honoring a PCI read ahead command received by the host bridge from a PCI master, host bridge 114 fetches the initial data. Moreover, rather than waiting for the PCI read master device 120 to instruct the host bridge 114 to fetch yet another piece of data, host bridge 114 simply fetches data ahead of time, i.e. prefetches. The host bridge 114 speculatively performs read ahead to the SM to minimize latency in returning read data to the PCI read master device 120. The prefetched data is held in a read data return holding buffer located inside PCI interface 102. The holding buffer is a first-in first-out (FIFO) buffer. Over a long period of time the latency is reduced because as the PCI read master device 120 would like to have a piece of data, data is available in the holding buffer almost instantaneously. When host bridge 114 is prefetching, the host bridge 114 speculatively assumes that the PCI device 120 utilizes all the prefetched data. Most of the time, speculation is correct, because the PCI device states the intention to fetch more than one line of data. Latency is therefore reduced as time to process a new fetch command packet is saved.

At some point in time when the PCI read master device 120 is satisfied, PCI read master device 120 disengages.

From a timeline perspective, when the PCI read master 120 disengages, it takes some latency for information about disengagement to be communicated to prefetch controller 104. Therefore, when the PCI read master 120 disengages, it is highly likely that the prefetching operation that has been launched by the prefetch controller 104 is still ongoing. When PCI read master 120 disengages, PCI interface 102 sends a message to prefetch controller 104 indicating that the read master 120 has disengaged. Prefetch controller 104 receives a MASTER DISENGAGED signal from PCI interface 102, which indicates that there is no longer a need to perform further accesses to DRAM 116. Accordingly, prefetch controller 104 stops additional read ahead requests, receives and discards any outstanding read return data, and when possible, attempts an abort request by sending a signal ABORT REQUEST to memory controller 106 indicating to the memory controller 106 that it should abort the operation of retrieving data from DRAM 116, i.e. should abort the read ahead access to the DRAM 116. The prefetch controller 104 generates the ABORT REQUEST signal if a window of opportunity is open. Typically, a window of opportunity is open at the beginning of a cycle when the prefetch controller 104 marks the beginning of a prefetch operation. The window of opportunity closes at a point in time when the memory controller 106 has committed a request to the DRAM for a particular prefetch. That point in time is herein referenced as "access commit point." An access commit point is typically a point in time when the memory controller sends a request for data access to DRAM 116. If the memory controller 106 receives the ABORT REQUEST signal ahead of time, i.e. before the access commit point, memory controller 106 responds to the prefetch controller with a signal ABORT ACCEPTED.

Figure 2:
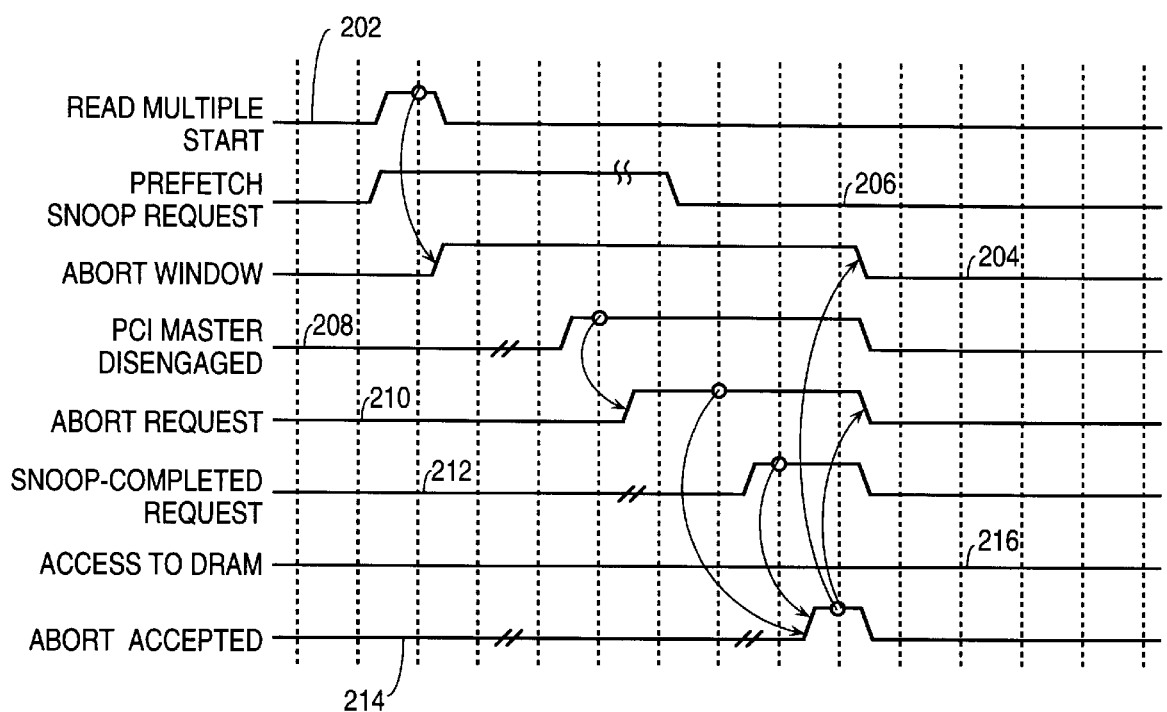
FIG. 2 illustrates a timing diagram with signals involved in the operation of a computer system that includes one embodiment of a host bridge according to the present invention.

FIG. 2 illustrates a timing diagram showing signals involved in the operation of an embodiment of a host bridge according to the present invention. A READ MULTIPLE START signal 202 is asserted upon initiation of a prefetch operation. This signal is asserted by the prefetch controller 104 to memory controller 106 of FIG. 1. Note that structures referenced by numerals starting with a "1" such as "1xx" are shown in FIG. 1. When the READ MULTIPLE START signal 202 is asserted, it causes an ABORT WINDOW signal 204 to be asserted. The ABORT WINDOW signal 204, when asserted, marks a time interval within which it is known that the associated prefetch has not been requested by the memory controller 106 to DRAM. While the window, defined by the ABORT WINDOW signal, is open, the prefetch controller 104 may assert an ABORT REQUEST signal 210 to memory controller 106. Accordingly, when the ABORT WINDOW signal 204 is high, it indicates that the opportunity for abort exists. When the ABORT WINDOW signal 204 is low, it indicates that the abort window is closed and therefore there is no opportunity to abort. Prefetch controller 104 generates an ABORT REQUEST signal 210 to memory controller 106, prompted by a PCI MASTER DISENGAGED signal 208, before memory controller 106 performs a memory read ahead to system memory 116, i.e., before an access commit point of the memory controller 106 to system memory 116. After memory controller 106 performs a memory read ahead to system memory 116, the ABORT WINDOW signal 204 is de-asserted, and the ABORT REQUEST signal 210 may not be asserted.

At a substantially same time with assertion of the READ MULTIPLE START signal 202, a PREFETCH SNOOP REQUEST signal 206 is asserted by prefetch controller 104 to host interface 108. Typically, for read access to DRAM 116, the prefetch controller 104 sends a PREFETCH SNOOP REQUEST 206 signal to host interface 108. Before data is fetched from DRAM 116, a snooping operation is performed. Host interface 108 sends the PREFETCH SNOOP REQUEST signal 206 to host processor 110 to perform a snoop in a cache of host processor 110. The cache, typically, contains duplication of data from DRAM 116. Because there may be a discrepancy between data in the cache and data in DRAM 116, as the cache has more up-to-date data than DRAM 116, host bridge 114 must query host bus 112, before accessing the actual contents of DRAM 116 for any operation that requires access to cacheable range in DRAM 116. The query determines if an entry in the cache, corresponding to the entry to be accessed in the DRAM, has been modified in any way. If the entry has been modified in the cache, the content of the DRAM is considered stale. The updated line from the cache is then extracted and copied into DRAM 116. In this case, host bridge 114 does not get data from DRAM 116, which is stale, but gets data from the cache which is updated, for the purpose of returning that data to the PCI read master 120 that requested that data. Upon completion of the snooping operation, host bridge 114 determines whether data to be accessed in DRAM 116 is clean. If such is the case, host bridge 114 indicates that one may proceed and obtain data from DRAM 116. Alternatively, if data has been modified in the cache, host bridge 114 waits for the host processor 110 to send the data to DRAM 116 before one may access DRAM 116.

When the PCI read master disengages, a signal PCI MASTER DISENGAGED 208 is asserted to the prefetch controller 104. Upon detecting that the PCI read master has disengaged, prefetch controller 104, asserts ABORT REQUEST signal 210 to memory controller 106, as long as the ABORT WINDOW signal 204 is asserted. The point in time when the abort window may close is a point in time when memory controller 106 has committed a request to DRAM. At that point in time, the memory controller 106 closes the abort window.

In the particular case explained in connection with the timing diagram of FIG. 2, memory controller 106 has not yet reached the access commit point where it accessed DRAM 116. Accordingly, the abort window is still open. While this window of opportunity is still open, prefetch controller 104 may still assert an ABORT REQUEST signal 210 to memory controller 106. If memory controller 106 receives the ABORT REQUEST signal before the access commit point to the DRAM 116, memory controller 106 responds to prefetch controller 104 with an ABORT ACCEPTED signal 214. Memory controller 106 then waits for SNOOP REQUEST COMPLETED signal 212 to be asserted by host interface 108 of FIG. 1 and simply ignores this request. The ABORT ACCEPTED signal 214 tells prefetch controller 104 not to expect data, nor worry about discarding any data that may return from memory controller 106, as none will return.

However, an ABORT REQUEST signal 210 is not accepted if asserted after memory controller 106 has received SNOOP REQUEST COMPLETED signal 212 and after memory controller 106 has acted upon it by sending a request to DRAM 116. If the ABORT REQUEST signal is received too late, the memory controller does not return "ABORT ACCEPTED", but instead de-asserts ABORT WINDOW signal 204. The prefetch controller that detects ABORT WINDOW de-assertion, would then have to wait for data from DRAM 116 to return and proceed to discard that data.

When the memory controller 106 receives the SNOOP REQUEST COMPLETED signal and an ABORT REQUEST signal has not been asserted so far, the memory controller 106 makes a request to DRAM 116. Then the memory controller 106 marks the window of opportunity closed by deasserting the ABORT WINDOW signal 204. This deassertion of the ABORT WINDOW signal 204 tells prefetch controller 104 not to attempt an abort as the memory controller 106 has begun the request to the memory.

In FIG. 2 ABORT REQUEST signal 210 is asserted before the SNOOP COMPLETED REQUEST signal 212 is asserted. In this case, memory controller 106 may abort the prefetch transaction to the DRAM 116, suppressing access to DRAM 116, ignoring the prefetch request, and generating an ABORT ACCEPTED signal 214 as an acknowledgement to the prefetch controller 104. The ABORT ACCEPTED signal 214 is asserted a little bit after SNOOP REQUESTED COMPLETED 212 signal was asserted and the DRAM access was suppressed. By suppressing access to DRAM 116 a performance gain is realized. The time that otherwise may have been used to make unneeded access to the DRAM 116 may be used by the memory controller to honor requests coming from other different interfaces.

In the previous detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A computer system comprising:
    a host processor (HP);
    a system memory (SM);
    an input/output (I/O) device; and
    a bridge, coupled to said HP, SM, and I/O device, to read ahead from said SM when said I/O device reads a continuous stream of data from said SM, and to abort a read ahead access to said SM, responsive to disengagement of the I/O device, if a corresponding read request has not been dispatched to the SM.

2. The computer system of claim 1, wherein said bridge includes a memory controller (MC), coupled to said SM, to abort said read ahead accesses.

3. The computer system of claim 2, wherein said bridge includes a prefetch controller to generate an abort request to said MC upon indication of I/O device disengagement.

4. The computer system of claim 3, wherein said MC is configured to abort said read ahead accesses responsive to said abort request.

5. The computer system of claim 2, wherein said MC is configured to abort said read ahead accesses responsive to an abort request received by said MC prior to an indication of snoop request completed.

6. The computer system of claim 3, wherein said prefetch controller is configured to request from said MC to perform read ahead accesses to said SM.

7. The computer system of claim 6, wherein said prefetch controller is configured to request prefetch snoop from said host processor when read of a continuous stream of data to said SM is desired.

8. The computer system of claim 3, wherein said bridge further includes an I/O interface, coupled to said I/O device and to said prefetch controller, to inform said prefetch controller of master disengagement.

9. The computer system of claim 3, wherein said bridge further includes a host interface coupled to said prefetch controller and to said MC.

10. The computer system of claim 3, wherein said MC is configured to assert an abort window signal to said prefetch controller when read of a continuous stream of data is desired and to deassert said abort window signal after said corresponding read request has been dispatched to the SM.

11. The computer system of claim 10, wherein the assertion of the abort window signal marks a time interval within which an opportunity to abort a corresponding read ahead access to said SM exists.

12. The computer system of claim 10, wherein said MC is configured to assert to said prefetch controller an abort accepted signal when said abort request received while said abort window signal is asserted.

13. A bridge coupled to a system memory (SM) and to an input output (I/O) device, said bridge comprising:
    a memory controller (MC) to read ahead from said SM when said I/O device reads a continuous stream of data from said SM and to abort read ahead accesses to said SM responsive to disengagement of the I/O device if prior to an access commit point to said SM.

14. The bridge of claim 13, further including a prefetch controller to generate an abort request to said MC upon indication of I/O device disengagement.

15. The computer system of claim 14, wherein said MC is configured to abort said read ahead responsive to said abort request.

16. The computer system of claim 15, wherein said MC is configured to abort said read ahead accesses responsive to an abort request received by said MC prior to an indication of snoot request completed.

17. The computer system of claim 14, wherein said prefetch controller is configured to request prefetch snoot from said host processor when read of a continuous stream of data to said SM is desired.

18. The computer system of claim 14, wherein said MC is configured to assert an abort window signal to said prefetch controller when read of a continuous stream of data is desired and to deassert said abort window signal after said access commit point to the SM.

19. The computer system of claim 18, wherein the assertion of the abort window signal marks a time interval within which an opportunity to abort a corresponding read ahead access to said SM exists.

20. The computer system of claim 18, wherein said MC is configured to assert to said prefetch controller an abort accepted signal when said abort request received while said abort window signal is asserted.

21. In a computer system, a method of performing accesses to a system memory (SM), the method comprising:
    reading ahead from the SM when an input/output (I/O) device reads a continuous stream of data; and
    aborting read ahead accesses to said SM, if prior to an access commit point to said SM, when said I/O device disengages.

22. The method of claim 21, further comprising:
    asserting an abort window signal when read of a continuous stream of data is desired; and
    deasserting said abort window signal after said access commit point to said SM.

23. The method of claim 22, wherein the assertion of the abort window signal marks a time interval within which an opportunity to abort a corresponding read ahead access to said SM exists.

* * * * *